(12) United States Patent
Shiode

(10) Patent No.: US 11,198,945 B2
(45) Date of Patent: Dec. 14, 2021

(54) ELECTRONIC COMPONENT AND METHOD THEREOF

(71) Applicant: Murata Manufacturing Co., Ltd., Kyoto-fu (JP)

(72) Inventor: Tomoyuki Shiode, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 21 days.

(21) Appl. No.: 16/719,576

(22) Filed: Dec. 18, 2019

(65) Prior Publication Data

US 2020/0203720 A1    Jun. 25, 2020

(30) Foreign Application Priority Data

Dec. 21, 2018  (JP) .............................. JP2018-239986

(51) Int. Cl.
| | | |
|---|---|---|
| *B32B 15/04* | (2006.01) | |
| *C25D 7/00* | (2006.01) | |
| *H01M 4/36* | (2006.01) | |
| *H01M 4/38* | (2006.01) | |
| *C25D 3/30* | (2006.01) | |
| *C25D 3/12* | (2006.01) | |
| *C25D 7/06* | (2006.01) | |

(Continued)

(52) U.S. Cl.
CPC .............. *C25D 7/00* (2013.01); *B32B 15/043* (2013.01); *C25D 3/12* (2013.01); *C25D 3/30* (2013.01); *C25D 5/12* (2013.01); *C25D 5/18* (2013.01); *C25D 7/0642* (2013.01); *H01M 4/366* (2013.01); *H01M 4/387* (2013.01); *B32B 2311/08* (2013.01); *B32B 2311/16* (2013.01); *B32B 2311/22* (2013.01); *B32B 2457/16* (2013.01)

(58) Field of Classification Search
None
See application file for complete search history.

(56) References Cited

U.S. PATENT DOCUMENTS

| | | | | |
|---|---|---|---|---|
| 6,195,248 | B1 * | 2/2001 | Kunishi | H01C 1/142 |
| | | | | 361/305 |
| 6,461,540 | B2 * | 10/2002 | Taira | H01B 1/16 |
| | | | | 174/120 R |
| 11,011,307 | B2 * | 5/2021 | Harada | H01G 4/228 |

(Continued)

FOREIGN PATENT DOCUMENTS

| | | |
|---|---|---|
| JP | 2000-077253 A | 3/2000 |
| JP | 2014-179570 A | 9/2014 |

OTHER PUBLICATIONS

An Office Action; "Notice of Reasons for Refusal," mailed by the Japanese Patent Office dated Jun. 8, 2021, which corresponds to Japanese Patent Application No. 2018-239986 and is related to U.S. Appl. No. 16/719,576 with English language translation.

*Primary Examiner* — Seth Dumbris
(74) *Attorney, Agent, or Firm* — Studebaker & Brackett PC

(57) ABSTRACT

An electronic component includes an element main body and at least a pair of outer electrodes on the element main body. The outer electrodes each include an underlying electrode layer positioned so as to be in contact with the element main body and a plating layer positioned so as to be in contact with the underlying electrode layer. The plating layer includes a Ni—Sn alloy plating layer positioned so as to be in contact with the underlying electrode layer.

11 Claims, 9 Drawing Sheets

(51) Int. Cl.
*C25D 5/12* (2006.01)
*C25D 5/18* (2006.01)

(56) References Cited

U.S. PATENT DOCUMENTS

| | | | | |
|---|---|---|---|---|
| 2002/0001712 A1* | 1/2002 | Higuchi | ................ | H01G 4/232 |
| | | | | 428/336 |
| 2009/0310277 A1* | 12/2009 | Kayatani | ................ | H01G 4/005 |
| | | | | 361/306.3 |
| 2014/0306787 A1* | 10/2014 | Kato | ...................... | H03H 7/427 |
| | | | | 336/105 |
| 2015/0054388 A1* | 2/2015 | Itagaki | ................... | H01C 7/008 |
| | | | | 310/364 |
| 2015/0279562 A1* | 10/2015 | Nishisaka | ............ | H01G 4/2325 |
| | | | | 361/301.4 |

\* cited by examiner

ELECTRONIC COMPONENT AND METHOD THEREOF

CROSS-REFERENCE TO RELATED APPLICATION

This application claims benefit of priority to Japanese Patent Application No. 2018-239986, filed Dec. 21, 2018, the entire content of which is incorporated herein by reference.

BACKGROUND

Technical Field

The present disclosure relates to an electronic component that includes an outer electrode including a plating layer and to a method for producing the electronic component.

Background Art

Electronic components represented by, for example, coil components and capacitors typically include at least a pair of outer electrodes for electrically connecting to other elements, such as circuit substrates. Such an outer electrode may include an underlying electrode layer and a plating layer positioned so as to cover the underlying electrode layer. The underlying electrode layer is electrically connected directly to a lead-out conductor led from inside the element main body, at the surface of the element main body.

The underlying electrode layer can be formed, for example, by applying, for example, a paste of Ag or Cu to, for example, both end surfaces of an element main body that has been fired and thereafter baking the paste. Further forming a Ni plating layer and a Sn plating layer in this order on the formed underlying electrode layer typically results in an electronic component including an outer electrode having good workability during mounting by soldering and having reliable connectivity.

Electronic components often need humidity resistance. For example, Japanese Unexamined Patent Application Publication No. 2014-179570 discloses a common mode choke coil that includes a non-magnetic layer, magnetic layers disposed so as to sandwich the non-magnetic layer, and two or more coil conductors embedded in an element body including the non-magnetic layer and the magnetic layers. During densification after firing, minute pores remain inside the non-magnetic layer, and ingress of water into the common mode choke coil may occur through such pores. Thus, the insulating properties are likely to be degraded. The reliability of a common mode choke coil according to Japanese Unexamined Patent Application Publication No. 2014-179570 under a moisture load is improved by segregation of a certain form of Mg in the non-magnetic material.

When the outer electrode includes a combination of an underlying electrode layer containing, for example, Ag or Cu and a Ni plating layer covering the underlying electrode layer, stress concentrates on the interface between the underlying electrode layer and the Ni plating layer, since Ni plating is very hard. As a result, it has been found that a space is formed between the underlying electrode layer and the Ni plating layer. When such a space is formed, ingress of water into the space may occur in a high-humidity and high-pressure environment. Due to the ingress, electrochemical migration (i.e., elongation or transference of a substance, such as a metal, contained in the electrode layer) may occur in the underlying electrode layer. The occurrence of electrochemical migration in the underlying electrode layer leads to a malfunction of the electronic component in a short period.

The reliability of a common mode choke coil according to Japanese Unexamined Patent Application Publication No. 2014-179570 under a moisture load is improved by appropriately changing the segregation of Mg in the non-magnetic material, as described above. However, the structure of the outer electrode is the same as that of the related art. The underlying electrode layer is formed by applying a Ag paste, performing baking, and performing Ni and Sn plating. Thus, in a high-humidity and high-pressure environment, a space is formed between the Ag electrode layer and the Ni plating layer in the outer electrode, and ingress of water to the Ag electrode layer occurs. As a result, electrochemical migration may occur in the Ag electrode layer.

From the foregoing, the present disclosure provides an electronic component including an outer electrode having excellent electrochemical migration resistance in a high-moisture and high-pressure environment and a method for producing the electronic component.

SUMMARY

To solve the problem of electrochemical migration occurring, ingress of water into the space between the underlying electrode layer and the Ni plating layer should be prevented. It has been found that positioning, between the underlying electrode layer and the Ni plating layer in the outer electrode, a Ni—Sn alloy plating layer in which Sn is co-deposited during Ni plating prevents a space from forming between the underlying electrode layer and the Ni—Sn alloy plating layer and thus, ingress of water to the underlying electrode layer is prevented and therefore, electrochemical migration is unlikely to occur. The reason for this may be that a Sn plating layer is more flexible than a Ni plating layer, and thus, stress is unlikely to concentrate on the interface.

According to a first aspect of the present disclosure, there is provided an electronic component including an element main body and at least a pair of outer electrodes on the element main body. The outer electrodes each include an underlying electrode layer positioned so as to be in contact with the element main body and a plating layer positioned so as to be in contact with the underlying electrode layer. The plating layer includes a Ni—Sn alloy plating layer positioned so as to be in contact with the underlying electrode layer.

According to an embodiment of the first aspect of the present disclosure, the underlying electrode layer may contain one or more of Ag and Cu.

According to an embodiment of the first aspect of the present disclosure, the underlying electrode layer may contain Ag.

According to an embodiment of the first aspect of the present disclosure, the plating layer may further include a Ni plating layer and a Sn plating layer, and the Ni—Sn alloy plating layer, the Ni plating layer, and the Sn plating layer may be positioned on the underlying electrode layer in this order.

According to an embodiment of the first aspect of the present disclosure, the plating layer may further include a Sn plating layer, and the Ni—Sn alloy plating layer and the Sn plating layer may be positioned on the underlying electrode layer in this order.

According to an embodiment of the first aspect of the present disclosure, the plating layer may further include a Ni plating layer, another Ni—Sn alloy plating layer, and a Sn plating layer, and the Ni—Sn alloy plating layer, the Ni plating layer, the other Ni—Sn alloy plating layer, and the Sn plating layer may be positioned on the underlying electrode layer in this order.

According to an embodiment of the first aspect of the present disclosure, the Ni—Sn alloy plating layer may contain a Ni—Sn alloy represented by the following formula (1):

$$(100-x)\text{Ni}-x\text{Sn} \quad (1)$$

in formula (1), x represents Sn content (at %) and satisfies 5≤x≤50.

According to an embodiment of the first aspect of the present disclosure, the Ni—Sn alloy plating layer may have a thickness of 0.1 μm or more and 15 μm or less (i.e., from 0.1 μm to 15 μm).

According to an embodiment of the first aspect of the present disclosure, the electronic component may be a coil component and further include a coil conductor embedded in the element main body, and the coil conductor and the outer electrodes may be electrically connected to each other.

According to the above embodiment of the first aspect of the present disclosure, the electronic component may be a common mode choke coil and include at least two of the coil conductors and at least two pairs of the outer electrodes.

According to a second aspect of the present disclosure, there is provided a method for producing an electronic component including an element main body and at least a pair of outer electrodes on the element main body. The outer electrodes each including an underlying electrode layer and a plating layer. The method includes forming the underlying electrode layer on the element main body and forming the plating layer on the underlying electrode layer by electroplating treatment. In the electroplating treatment, a plating solution contains Sn ions and Ni ions, and a current profile includes a first current profile in which current is controlled to 1 A or more and less than 20 A (i.e., from 1 A to 20 A). The first current profile includes at least one of a term in which current is maintained at a certain value and a term in which current is increased.

According to an embodiment of the second aspect of the present disclosure, the current profile may further include a second current profile in which current is controlled to 20 A or more and 100 A or less (i.e., from 20 A to 100 A) after the first current profile.

According to an embodiment of the second aspect of the present disclosure, the underlying electrode layer may contain one or more of Ag and Cu.

According to an embodiment of the second aspect of the present disclosure, the underlying electrode layer may contain Ag.

According to an embodiment of the second aspect of the present disclosure, in the first current profile, the increasing rate of current may be 50 A/min or less in the term in which current is increased. According to an embodiment of the second aspect of the present disclosure, the first current profile and the second current profile may each include a term in which current is maintained at a certain value. The current in the first current profile may be 1% or more and 50% or less (i.e., from 1% to 50%) of the current in the second current profile.

The present disclosure provides an electronic component including an outer electrode having excellent electrochemical migration resistance in a high-humidity and high-pressure environment and a method for producing the electronic component.

Other features, elements, characteristics and advantages of the present disclosure will become more apparent from the following detailed description of preferred embodiments of the present disclosure with reference to the attached drawings.

DETAILED DESCRIPTION

Figure 1:
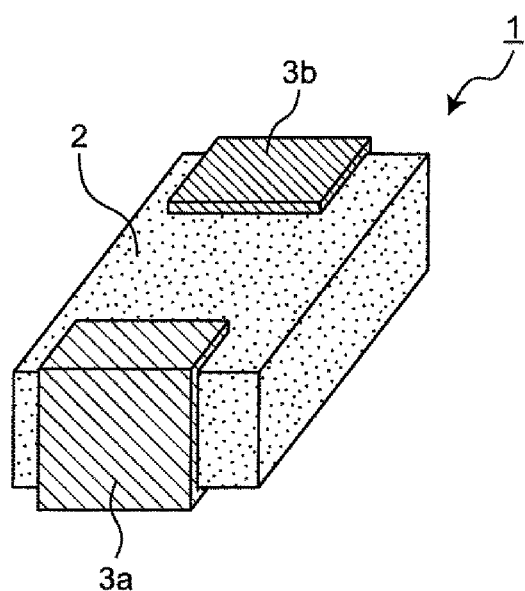
FIG. 1 is a view of an exemplary electronic component according to the present disclosure.

FIG. 1 is a view of an exemplary electronic component according to the present disclosure. As illustrated in FIG. 1, an electronic component 1 includes an element main body 2 and a pair of an outer electrode 3a and an outer electrode 3b that are disposed on the element main body 2. The electronic component 1 may be a coil component. When the electronic component 1 is a coil component, the electronic component 1 further includes a coil conductor (not illustrated) embedded in the element main body 2, and the coil conductor may be electrically connected to the pair of the outer electrode 3a and the outer electrode 3b.

Examples of the type of the electronic component 1 are not particularly limited and include various components of electronic devices, in addition to coil components. Examples of the electronic devices include resistive elements, capacitors, diodes, transistors, and relays. In particular, the electronic component 1 may be a common mode choke coil, which will be fully described later.

The element main body 2 refers to the main body portion other than the outer electrodes 3a and 3b in each of the various electronic components 1. The material of the element main body 2 may contain ceramics. For example, the material of the element main body 2 contain one or more of dielectric ceramics, piezoelectric ceramics, semiconductor ceramics, magnetic material ceramics, non-magnetic ceramics, and insulating ceramics; however, the material may contain another substance.

Furthermore, in the present disclosure, the outer electrodes 3a and 3b are disposed on at least a portion of the surface of the element main body 2 and electrically connect the electronic component 1 to, for example, another electronic component.

Hereinafter, with reference to the drawings, the specific structures of the outer electrodes of electronic components in various embodiments according to the present disclosure and a method for producing an electronic component including the outer electrodes will be fully described. However, the present disclosure is not limited to such embodiments.

First Embodiment

Figure 2:
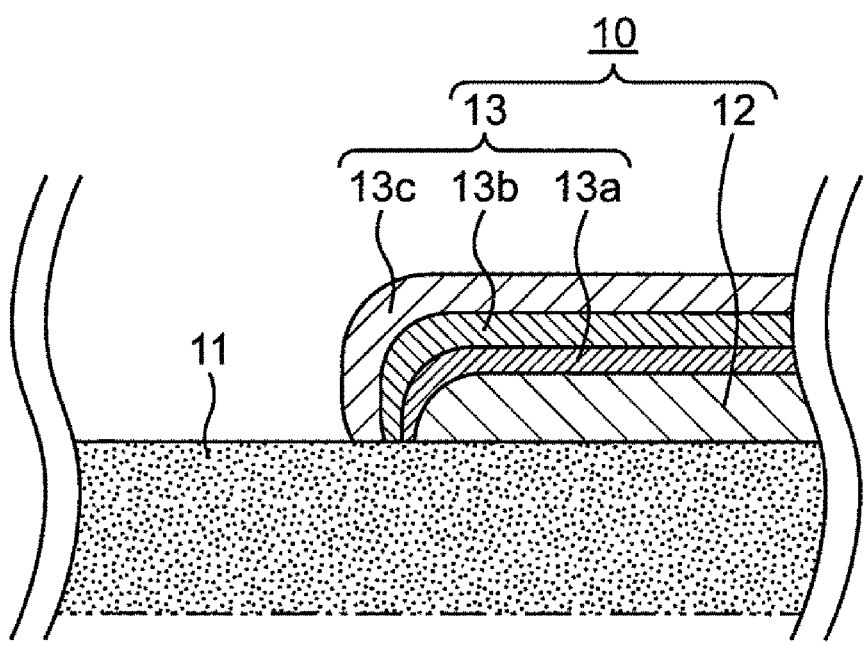
FIG. 2 is a cross-sectional view of a first embodiment of the outer electrode of an electronic component according to the present disclosure.

FIG. 2 is a cross-sectional view of a first embodiment of the outer electrode of the electronic component according to the present disclosure. As illustrated in FIG. 2, an outer electrode 10 includes an underlying electrode layer 12 positioned so as to be in contact with an element main body 11 and a plating layer 13 positioned so as to be in contact with the underlying electrode layer 12, particularly so as to cover the underlying electrode layer 12. The plating layer 13 includes a Ni—Sn alloy plating layer 13a positioned on the underlying electrode layer 12 so as to be in contact with the underlying electrode layer 12, a Ni plating layer 13b, and a Sn plating layer 13c. In other words, the Ni—Sn alloy plating layer 13a, the Ni plating layer 13b, and the Sn plating layer 13c are positioned on the underlying electrode layer 12 in this order. As described above, the element main body 11 may be included in any electronic component.

The underlying electrode layer 12 may be electrically connected to, for example, a lead-out conductor (not illustrated) led from inside the element main body 11. Thus, the underlying electrode layer 12 may be any layer, provided that the underlying electrode layer 12 contains a conductive material. The underlying electrode layer 12 contains, for example, metal or a material containing metal. The material of the underlying electrode layer 12 may particularly contain one or more of Ag and Cu and more particularly Ag. When the underlying electrode layer 12 contains a material containing Ag, electrochemical migration is likely to occur, and thus, in a high-humidity and high-pressure environment, an electrochemical migration resistance effect is more suitably exhibited.

The underlying electrode layer 12 may have any thickness, provided that the underlying electrode layer 12 sufficiently functions as an electrode layer of the outer electrode 10. The underlying electrode layer 12 may have a thickness of 5 μm or more and 200 μm or less (i.e., from 5 μm to 200 μm), particularly 10 μm or more and 100 μm or less (i.e., from 10 μm to 100 μm), and more particularly 10 μm or more and 50 μm or less (i.e., from 10 μm to 50 μm). The underlying electrode layer 12 has a thickness of 5 μm or more, and thus, the electrical connection between the inside of the element main body 11 and the underlying electrode layer 12 is strengthened. The underlying electrode layer 12 has a thickness of 200 μm or less, and thus, the outer electrode 10 can be readily incorporated into a small electronic component.

The Ni—Sn alloy plating layer 13a may contain, for example, a Ni—Sn alloy represented by the following formula (1):

$$(100-x)\text{Ni}-x\text{Sn} \quad (1)$$

(in formula (1), x represents Sn content (at %) and satisfies 5≤x≤50.)

In formula (1), x may particularly satisfy 5≤x≤45, more particularly 5≤x≤40, still more particularly 5≤x≤35, still more particularly 5≤x≤30, and still more particularly 5≤x≤25. The reason for this is that when the Sn content (at %) of the Ni—Sn alloy is lower than that of a Ni—Sn alloy having a composition of 44Ni-56Sn (at %), the melting point rises to 794.5° C. and as a result, soldering of a portion of the outer electrode 10 can be well performed later.

In the present disclosure, "element content" refers to the ratio of the number of atoms of an element to the number of all atoms of a Ni—Sn alloy and is represented by the unit, at % (atom percent). More specifically, "element content" refers to the element content measured by surface analysis of a cross section of a Ni—Sn alloy plating layer by using an electron probe micro analyzer (EPMA).

The composition of a Ni—Sn alloy according to the present disclosure is represented by chemical symbols connected to each other by a hyphen. The Ni—Sn alloy may contain a trace amount of unavoidable metal, such as Zn, Sb, or Cu, provided that the Ni—Sn alloy substantially contains the elements in the composition.

For the same reason, the Ni—Sn alloy plating layer 13a may contain Sn in an amount of 1 mass % or more and 57 mass % or less (i.e., from 1 mass % to 57 mass %), particularly 5 mass % or more and 50 mass % or less (i.e., from 5 mass % to 50 mass %), more particularly 5 mass % or more and 45 mass % or less (i.e., from 5 mass % to 45 mass %), still more particularly 5 mass % or more and 40 mass % or less (i.e., from 5 mass % to 40 mass %), still more particularly 5 mass % or more and 35 mass % or less (i.e., from 5 mass % to 35 mass %), and still more particularly 5 mass % or more and 30 mass % or less (i.e., 5 mass % to 30 mass %) relative to the total mass of the Ni—Sn alloy.

The Ni—Sn alloy plating layer 13a may have a thickness of 0.1 μm or more and 15 μm or less (i.e., from 0.1 μm to 15 μm), particularly 0.1 μm or more and 10 μm or less (i.e., from 0.1 μm to 10 μm), more particularly 0.1 μm or more and 8 μm or less (i.e., from 0.1 μm to 8 μm), still more particularly 0.5 μm or more and 8 μm or less (i.e., from 0.5 μm to 8 μm), still more particularly 1 μm or more and 7 μm or less (i.e., from 1 μm to 7 μm), still more particularly 1 μm or more and 6 μm or less (i.e., from 1 μm to 6 μm), and still more particularly 1 μm or more and 5 μm or less (i.e., from 1 μm to 5 μm). The Ni—Sn alloy plating layer 13a has a thickness of 0.1 μm or more and thus suitably exhibits an electrochemical migration resistance effect. The Ni—Sn alloy plating layer 13a has a thickness of 15 µm or less, and thus, when another plating layer is stacked on the Ni—Sn alloy plating layer 13a, the resulting outer electrode 10 has a suitable thickness as a whole and can be readily incorporated into a small electronic component.

In the present disclosure, the thickness of the Ni—Sn alloy plating layer is measured as follows. A cross section of the outer electrode that is parallel to the thickness direction of the underlying electrode layer and the Ni—Sn alloy plating layer is exposed by polishing. The interface between the underlying electrode layer and the plating layer in the cross section and a portion near such an interface are subjected to mapping analysis of Sn and Ni by using wavelength-dispersive X-ray spectrometry. Here, "thickness of the Ni—Sn alloy plating layer" refers to the thickness of the layer in which Ni and Sn are present (i.e., a region in which Sn is detected in the Ni layer). More specifically, "thickness of the Ni—Sn alloy plating layer" refers to the thickness obtained by mapping analysis performed under conditions of an accelerating voltage of 15 kV and an irradiation current of $5\times10^{-8}$ A by using JXA-8100 manufactured by JEOL Ltd. "Thickness of the Ni plating layer" and "thickness of the Sn plating layer", which will be described later, are each equivalent to "thickness of the Ni—Sn alloy plating layer", except that the detected elements differ.

The Ni plating layer 13b may contain a trace amount of unavoidable metal, such as Sn, Zn, Sb, or Cu, provided that the Ni plating layer 13b substantially contains Ni. The Ni plating layer 13b is positioned on the Ni—Sn alloy plating layer 13a, and thus, the outer electrode 10 can have excellent corrosion resistance and excellent surface stability that are the original characteristics of Ni plating.

The Ni plating layer 13b may have any thickness. The Ni plating layer 13b may have a thickness of 0.5 µm or more and 6 µm or less (i.e., from 0.5 µm to 6 µm), particularly 1 µm or more and 5 µm or less (i.e., from 1 µm to 5 µm), more particularly 2 µm or more and 4 µm or less (i.e., from 2 µm to 4 µm), still more particularly 2.5 µm or more and 3.5 µm or less (i.e., 2.5 µm to 3.5 µm), and still more particularly 3 µm or more and 3.5 µm or less (i.e., 3 µm to 3.5 µm). The Ni plating layer 13b has a thickness of 0.5 µm or more, and thus, the outer electrode 10 suitably has, for example, excellent corrosion resistance. The Ni plating layer 13b has a thickness of 6 µm or less, and thus, when another plating layer is stacked on the Ni plating layer 13b, the resulting outer electrode 10 has a suitable thickness as a whole and can be readily incorporated into a small electronic component.

The Sn plating layer 13c may contain a trace amount of unavoidable metal, such as Ni, Zn, Sb, or Cu, provided that the Sn plating layer 13c substantially contains Sn. The Sn plating layer 13c is positioned on the Ni plating layer 13b, and thus, the workability of soldering of the electronic component performed later can be enhanced.

The Sn plating layer 13c may have any thickness. The Sn plating layer 13c may have a thickness of 1 µm or more and 10 µm or less (i.e., 1 µm to 10 µm), particularly 1 µm or more and 8 µm or less (i.e., 1 µm to 8 µm), more particularly 2 µm or more and 5 µm or less (i.e., 2 µm to 5 µm), still more particularly 2.5 µm or more and 4.5 µm or less (i.e., 2.5 µm to 4.5 µm), and still more particularly 3 µm or more and 4 µm or less (i.e., from 3 µm to 4 µm). The Sn plating layer 13c has a thickness of 1 µm or more, and thus, the plating layers under the Sn plating layer 13c are not degraded by soldering performed later and soldering is suitably performed. The Sn plating layer 13c has a thickness of 10 µm or less, and thus, the outer electrode 10 has a suitable thickness as a whole and can be readily incorporated into a small electronic component.

As described above, in the first embodiment, the Ni—Sn alloy plating layer 13a is positioned on the underlying electrode layer 12 of the outer electrode 10. Thus, a space is not formed between the underlying electrode layer 12 and the Ni—Sn alloy plating layer 13a. Owing to this, ingress of water to the underlying electrode layer 12 is unlikely to occur in a high-humidity and high-pressure environment, and thus, electrochemical migration is unlikely to occur. Furthermore, the Ni plating layer 13b is positioned on the Ni—Sn alloy plating layer 13a, and thus, the outer electrode 10 can have excellent corrosion resistance and excellent surface stability that are the original characteristics of Ni plating.

A method for producing an electronic component including the outer electrode 10 in the first embodiment will be described.

First, the underlying electrode layer 12 is formed so as to be in contact with the element main body 11. The underlying electrode layer 12 may be formed by any method known to one skilled in the art. For example, the underlying electrode layer 12 may be formed by applying a conductive paste and thereafter, performing baking, or by a method, such as patterning by photolithography or screen printing. The underlying electrode layer 12 may be formed so as to be electrically connected to, for example, a lead-out conductor led from inside the element main body 11.

Next, on the underlying electrode layer 12, the Ni—Sn alloy plating layer 13a, the Ni plating layer 13b, and the Sn plating layer 13c are formed in this order to form the plating layer 13. The outer electrode 10 is formed, accordingly.

Specifically, first, electroplating treatment is performed with respect to the underlying electrode layer 12 such that the Ni—Sn alloy plating layer 13a is deposited on the underlying electrode layer 12. In such electroplating treatment, the plating solution contains Sn ions and Ni ions. Furthermore, the current profile of the electroplating treatment includes a first current profile in which current is controlled to 1 A or more and less than 20 A (i.e., from 1 A to 20 A). The first current profile includes at least one of a term in which current is maintained at a certain value and a term in which current is increased. In the first current profile, the increasing rate of the current may be 50 A/min or less, particularly 35 A/min or less, more particularly 20 A/min or less, still more particularly 10 A/min or less, and still more particularly 1 A/min or less in the term in which current is increased. The reason for this is that setting the increasing rate of the current to 50 A/min or less results in good deposition of Sn and the Ni—Sn alloy plating layer 13a is suitably formed on the underlying electrode layer 12.

In the present disclosure, a plating solution that contains Ni ions added and that further contains Sn ions by a certain method is used to perform Ni electroplating (hereinafter, also referred to as Ni electroplating containing Sn ions). The method by which the plating solution contains Sn ions may be any method. For example, a commercially available Ni electroplating solution may be used with a commercially available plating medium having the outermost layer coated with Sn so that the electroplating solution contains Sn ions and Ni ions, thereby performing electroplating treatment. In such a method, according to the first embodiment, at such a low current of 1 A or more and less than 20 A (i.e., from 1 A or more and less than 20 A), not only is Ni in the Ni electroplating solution deposited, but also Sn in the medium surface is ionized and deposited on the underlying electrode layer 12 to form the Ni—Sn alloy plating layer 13a. The reason for this is that when the current density is decreased during Ni electroplating, Ni dissolves slowly and Sn, which has a slightly higher ionization tendency than Ni, is deposited faster than Ni. In other words, Sn in the outermost layer of the plating medium functions as an anode material. One skilled in the art can obtain Ni electroplating bath containing Sn ions, for example, by a method in which an anode material and commercially available Ni and Sn are appropriately used in combination or a method in which a commercially available Sn electroplating solution and a commercially available Ni electroplating solution are appropriately used in combination.

The range of the current controlled in the first current profile changes in accordance with, for example, a specific method of Ni electroplating containing Sn ions, a desired thickness of the Ni—Sn alloy plating layer 13a, and Sn content. The current may be in a range in which Sn, as well as Ni, is deposited and may thus be 1 A or more and less than 20 A (i.e., from 1 A to 20 A), particularly 1 A or more and 18 A or less (i.e., from 1 A to 18 A), more particularly 1 A or more and 15 A or less (i.e., from 1 A to 15 A), still more particularly 1 A or more and 13 A or less (i.e., from 1 A to 13 A), still more particularly 1 A or more and 10 A or less (i.e., from 1 A to 10 A), and still more particularly 1 A or more and 5 A or less (i.e., from 1 A to 5 A). The plating time in the first current profile changes in accordance with a specific value of the current, a specific method of electroplating treatment, a desired thickness of the Ni—Sn alloy plating layer 13a, and Sn content and is not particularly limited. Specifically, the plating time may be 2 minutes or more and 300 minutes or less (i.e., from 2 minutes to 300 minutes), particularly 2 minutes or more and 200 minutes or less (i.e., from 2 minutes to 200 minutes), more particularly 2 minutes or more and 150 minutes or less (i.e., from 2 minutes to 150 minutes), still more particularly 10 minutes or more and 150 minutes or less (i.e., from 10 minutes to 150 minutes), and still more particularly 50 minutes or more and 150 minutes or less (i.e., from 50 minutes to 150 minutes). Furthermore, the Ni content (at %) and the Sn content (at %) of the Ni—Sn alloy plating layer 13a can be adjusted by appropriately changing a specific value of the current and plating time in the first current profile.

The current profile of electroplating treatment in the first embodiment further includes a second current profile in which current is controlled to 20 A or more and 100 A or less (i.e., from 20 A to 100 A), particularly 20 A or more and 80 A or less (i.e., from 20 A to 80 A), more particularly 20 A or more and 60 A or less (i.e., from 20 A to 60 A), still more particularly 20 A or more and 50 A or less (i.e., from 20 A to 50 A), after the first current profile. The second current profile may include at least one of a term in which current is maintained at a certain value, a term in which current is increased, and a term in which current is decreased. Electroplating treatment in the second current profile may be the same as the above-described Ni electroplating containing Sn ions. In other words, after Ni electroplating containing Sn ions at a low current in the first current profile, Ni electroplating containing Sn ions is subsequently performed at a higher current in the second current profile to form the Ni plating layer 13b on the Ni—Sn alloy plating layer 13a. The reason for this is that when Ni electroplating containing Sn ions is performed at a current of 20 A or more, only Ni is deposited on the Ni—Sn alloy plating layer 13a and Sn is unlikely to be deposited. The plating time in the second current profile changes in accordance with a specific value of the current, a specific method of electroplating treatment, and a desired thickness of the Ni plating layer 13b and is not particularly limited. The plating time may be 5 minutes or more and 200 minutes or less (i.e., from 5 minutes to 200 minutes) and particularly 10 minutes or more and 100 minutes or less (i.e., from 10 minutes to 100 minutes). After Ni electroplating containing Sn ions in the first current profile, the typical Ni electroplating containing no Sn ions may be performed to form the Ni plating layer 13b on the Ni—Sn alloy plating layer 13a. The method of Ni electroplating may be any method. For example, a commercially available Ni plating solution may be used.

When the first current profile and the second current profile each include a term in which current is maintained at a certain value, the current in the first current profile may be 1% or more and 50% or less (i.e., from 1% to 50%) of the current in the second current profile, particularly 2% or more and 40% or less (i.e., from 2% to 40%), more particularly 3% or more and 30% or less (i.e., from 3% to 30%), still more particularly 4% or more and 20% or less (i.e., from 4% to 20%), and still more particularly 5% or more and 10% or less (i.e., from 5% to 10%). The proportion of the currents is set in the above range, and thus, the Ni—Sn alloy plating layer 13a on the underlying electrode layer 12 and the Ni plating layer 13b on the Ni—Sn alloy plating layer 13a can be efficiently formed so as to each have a thickness for exhibiting good electrochemical migration resistance and good plateability.

Figure 3A:
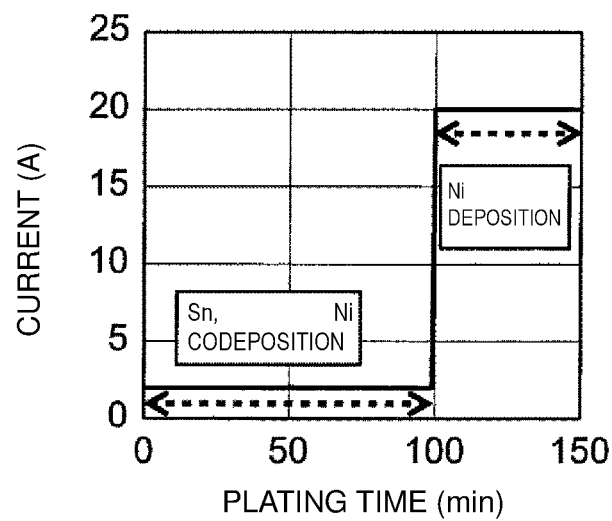
FIG. 3A is an exemplary graph of the correlation between the current and the time during Ni electroplating containing Sn ions in the first embodiment according to the present disclosure.
Figure 3B:
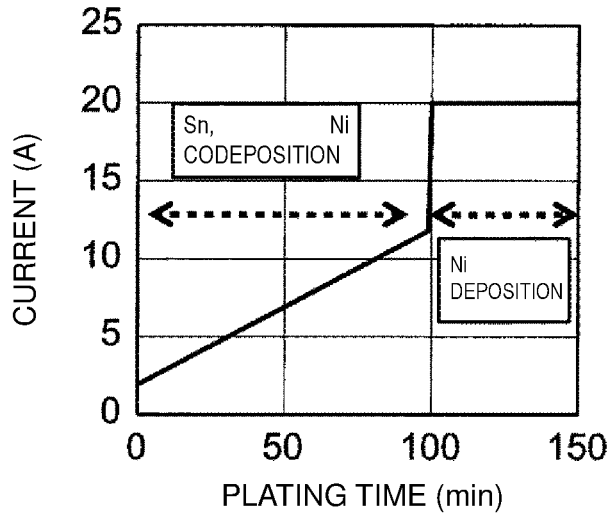
FIG. 3B is an exemplary graph of the correlation between the current and the time during Ni electroplating containing Sn ions in the first embodiment according to the present disclosure.

FIG. 3A and FIG. 3B are each an exemplary graph of the correlation between the current and the time during Ni electroplating containing Sn ions in the first embodiment according to the present disclosure. In the example of FIG. 3A, first, Ni electroplating containing Sn ions is performed on the underlying electrode layer 12 in accordance with the first current profile in which a constant current of 2 A is maintained for 100 minutes. In the example in FIG. 3B, first, Ni electroplating containing Sn ions is performed on the underlying electrode layer 12 in accordance with the first current profile in which current is increased from 2 A to 12 A over 100 minutes (i.e., the increasing rate of the current is 0.1 A/min). In these steps, Sn is deposited as well as Ni, and thus, the Ni—Sn alloy plating layer 13a is formed on the underlying electrode layer 12. Next, in each example in FIG. 3A and FIG. 3B, in accordance with the second current profile in which a constant current of 20 A is maintained for 50 minutes, Ni electroplating containing Sn ions is further performed. In these steps, only Ni is deposited, and thus, the Ni plating layer 13b is formed on the Ni—Sn alloy plating layer 13a.

At last, Sn plating is performed on the Ni plating layer 13b to form the Sn plating layer 13c, which is the outermost layer. The method of Sn plating is not particularly limited and may be Sn electroplating.

Second Embodiment

Figure 4:
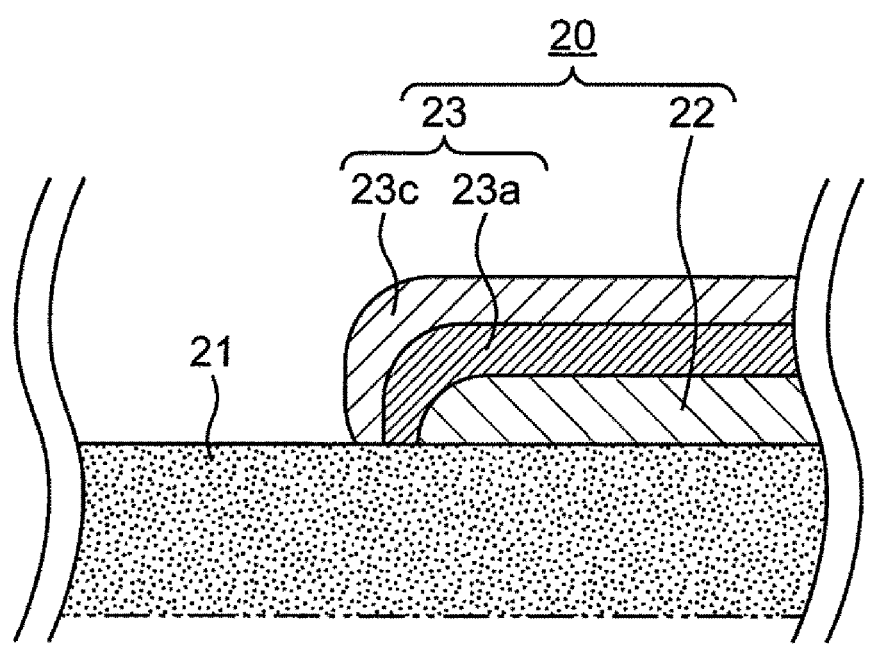
FIG. 4 is a cross-sectional view of a second embodiment of the outer electrode of the electronic component according to the present disclosure.

FIG. 4 is a cross-sectional view of a second embodiment of the outer electrode of the electronic component according to the present disclosure. As illustrated in FIG. 4, an outer electrode 20 includes an underlying electrode layer 22 positioned so as to be in contact with an element main body 21 and a plating layer 23 positioned so as to be in contact with the underlying electrode layer 22, particularly so as to cover the underlying electrode layer 22. The plating layer 23 includes a Ni—Sn alloy plating layer 23a positioned on the underlying electrode layer 22 so as to be in contact with the underlying electrode layer 22 and a Sn plating layer 23c. In other words, the Ni—Sn alloy plating layer 23a and the Sn plating layer 23c are positioned on the underlying electrode layer 22 in this order. As described above, the element main body 21 may be included in any electronic component.

In the second embodiment, the function, the material, and the thickness of the underlying electrode layer 22, the function, the material, and the thickness of the Ni—Sn alloy plating layer 23a, and the function, the material, and the thickness of the Sn plating layer 23c are the same as those in the first embodiment, except that the plating layer 23 does not include a Ni plating layer.

As described above, in the second embodiment, the Ni—Sn alloy plating layer 23a is positioned on the underlying electrode layer 22 of the outer electrode 20 in the same manner as in the first embodiment. Thus, a space is unlikely to be formed between the underlying electrode layer 22 and the Ni—Sn alloy plating layer 23a. Owing to this, ingress of water to the underlying electrode layer 22 is unlikely to occur in a high-humidity and high-pressure environment, and thus, electrochemical migration is unlikely to occur. Furthermore, unlike the outer electrode in the first embodiment, a Ni plating layer is not included. Thus, an electronic component including the outer electrode 20 can be produced more efficiently.

A method for producing the electronic component including the outer electrode 20 in the second embodiment will be described.

The method in the second embodiment is the same as that in the first embodiment, except that the current profile of the electroplating treatment does not include the second current profile in which current is controlled to 20 A or more and 100 A or less (i.e., from 20 A to 100 A) after the first current profile.

Figure 5A:
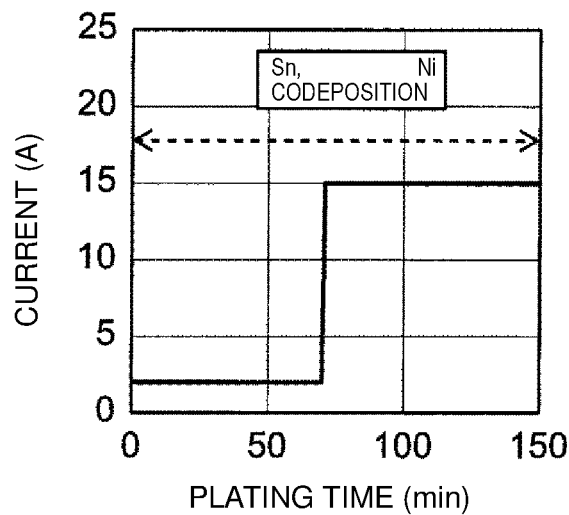
FIG. 5A is an exemplary graph of the correlation between the current and the time during Ni electroplating containing Sn ions in the second embodiment according to the present disclosure.
Figure 5B:
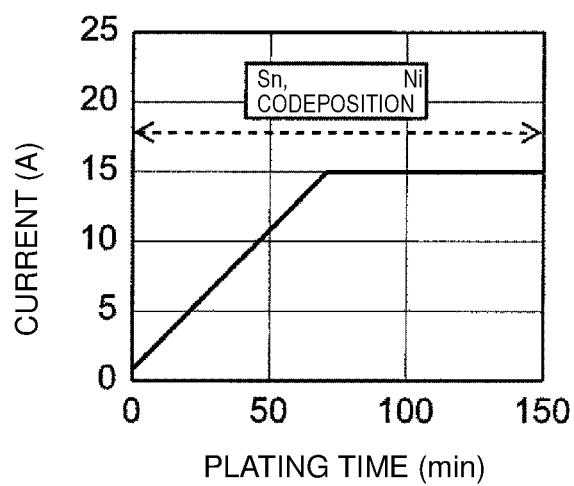
FIG. 5B is an exemplary graph of the correlation between the current and the time during Ni electroplating containing Sn ions in the second embodiment according to the present disclosure.
Figure 5C:
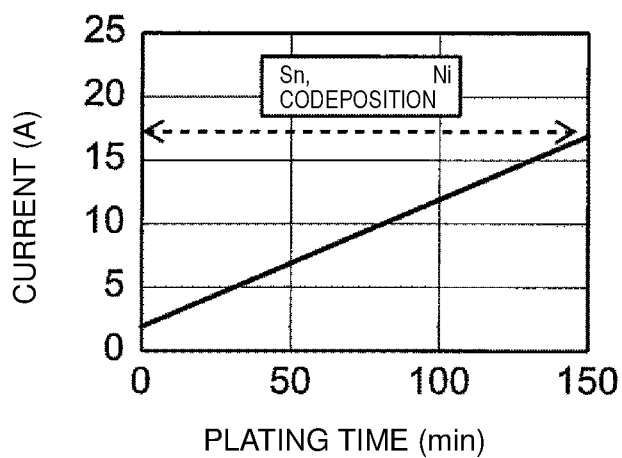
FIG. 5C is an exemplary graph of the correlation between the current and the time during Ni electroplating containing Sn ions in the second embodiment according to the present disclosure.

FIG. 5A, FIG. 5B, and FIG. 5C are each an exemplary graph of the correlation between the current and the time during Ni electroplating containing Sn ions in the second embodiment according to the present disclosure. In the example of FIG. 5A, Ni electroplating containing Sn ions is performed on the underlying electrode layer 22 in accordance with the first current profile including two steps including a step of maintaining a constant current of 2 A for 70 minutes and furthermore, a step of maintaining a constant current of 15 A for 80 minutes. In the example of FIG. 5B, Ni electroplating containing Sn ions is performed on the underlying electrode layer 22 in accordance with the first current profile including two steps including a step of increasing current from 2 A to 15 A over 70 minutes (i.e., the increasing rate of current is about 0.19 A/min) and furthermore, a step of maintaining a constant current of 15 A for 80 minutes. In the example of FIG. 5C, Ni electroplating containing Sn ions is performed on the underlying electrode layer 22 in accordance with the first current profile in which current is increased from 2 A to 17 A over 150 minutes (i.e., the increasing rate of the current is 0.1 A/min). In each step in examples of FIG. 5A, FIG. 5B, and FIG. 5C, Sn continues to be deposited as well as Ni, and thus, the Ni—Sn alloy plating layer 23a is formed on the underlying electrode layer 22.

At last, in the same manner as in the first embodiment, Sn plating is performed on the Ni—Sn alloy plating layer 23a to form the Sn plating layer 23c, which is the outermost layer. The method of Sn plating is not particularly limited and may be Sn electroplating.

Third Embodiment

Figure 6:
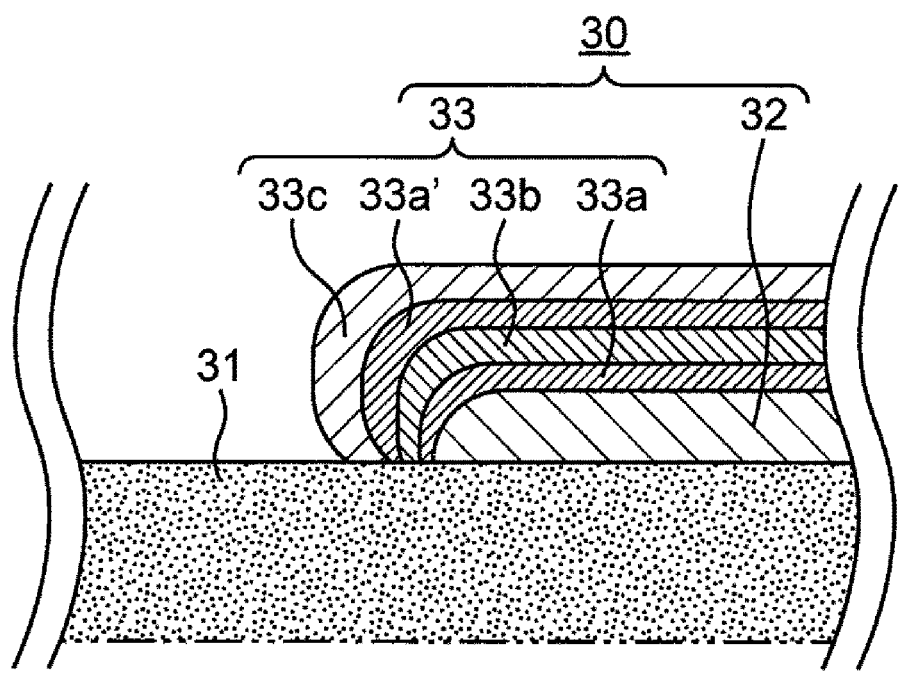
FIG. 6 is a cross-sectional view of a third embodiment of the outer electrode of the electronic component according to the present disclosure.

FIG. 6 is a cross-sectional view of a third embodiment of the outer electrode of the electronic component according to the present disclosure. As illustrated in FIG. 6, an outer electrode 30 includes an underlying electrode layer 32 positioned so as to be in contact with an element main body 31 and a plating layer 33 positioned so as to be in contact with the underlying electrode layer 32, particularly so as to cover the underlying electrode layer 32. The plating layer 33 includes a Ni—Sn alloy plating layer 33a positioned on the underlying electrode layer 32 so as to be in contact with the underlying electrode layer 32, a Ni plating layer 33b, a Ni—Sn alloy plating layer 33a', and a Sn plating layer 33c. In other words, the Ni—Sn alloy plating layer 33a, the Ni plating layer 33b, the Ni—Sn alloy plating layer 33a', and the Sn plating layer 33c are positioned on the underlying electrode layer 32 in this order. As described above, the element main body 31 may be included in any electronic component.

In the third embodiment, the function, the material, and the thickness of the underlying electrode layer 32, the function, the material, and the thickness of the Ni—Sn alloy plating layer 33a, the function, the material, and the thickness of the Ni plating layer 33b, and the function, the material, and the thickness of the Sn plating layer 33c are the same with those in the first embodiment, except that the plating layer 33 further includes the Ni—Sn alloy plating layer 33a' on the Ni plating layer 33b. The material and the thickness of the Ni—Sn alloy plating layer 33a' are the same as those of the Ni—Sn alloy plating layer 33a.

As described above, in the third embodiment, the Ni—Sn alloy plating layer 33a is positioned on the underlying electrode layer 32 of the outer electrode 30 in the same manner as in the first embodiment. Thus, a space is not formed between the underlying electrode layer 32 and the Ni—Sn alloy plating layer 33a. Owing to this, ingress of water to the underlying electrode layer 32 is unlikely to occur in a high-humidity and high-pressure environment, and thus, electrochemical migration is unlikely to occur. Furthermore, the outer electrode 30 in the third embodiment includes the Ni plating layer 33b positioned on the Ni—Sn alloy plating layer 33a, and thus, the outer electrode 30 can have excellent corrosion resistance and excellent surface stability that are the original characteristics of Ni plating. In addition, the outer electrode 30 further includes the Ni—Sn alloy plating layer 33a' between the Ni plating layer 33b and the Sn plating layer 33c and thus has excellent bondability as a whole.

A method for producing the electronic component including the outer electrode 30 in the third embodiment will be described.

The method in the third embodiment is the same as that in the first embodiment, except that the current profile of the electroplating treatment further includes, after the second current profile in which current is controlled to 20 A or more following the first current profile in which current is controlled to less than 20 A, a third current profile in which current is controlled to 1 A or more and less than 20 A (i.e., from 1 A to 20 A). The third current profile includes at least one of a term in which current is maintained at a certain value and a term in which current is decreased. The time and the range of the current of the third current profile may be the same as those of the first current profile. As described above, the current may be in the range in which Sn is also deposited.

Figure 7A:
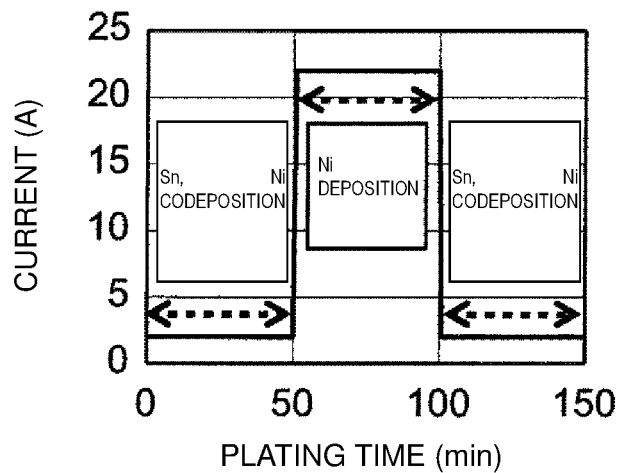
FIG. 7A is an exemplary graph of the correlation between the current and the time during Ni electroplating containing Sn ions in the third embodiment according to the present disclosure.
Figure 7B:
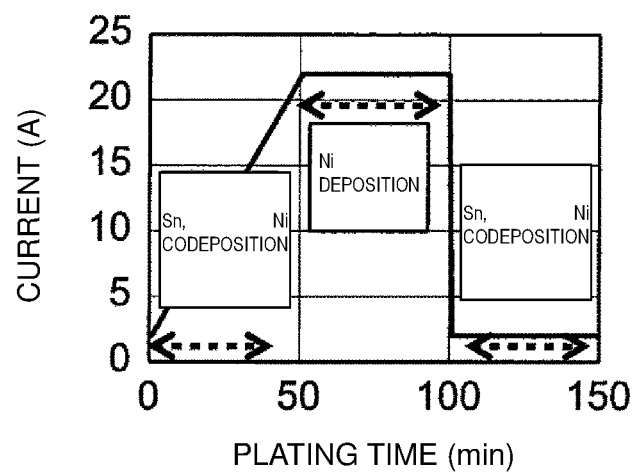
FIG. 7B is an exemplary graph of the correlation between the current and the time during Ni electroplating containing Sn ions in the third embodiment according to the present disclosure.
Figure 7C:
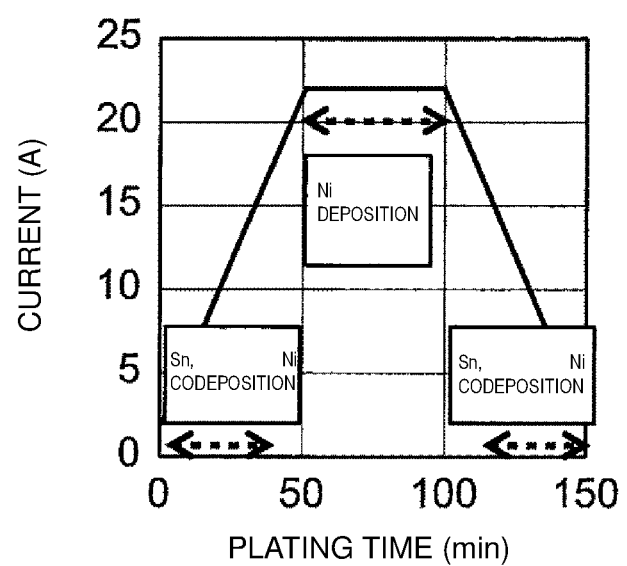
FIG. 7C is an exemplary graph of the correlation between the current and the time during Ni electroplating containing Sn ions in the third embodiment according to the present disclosure.

FIG. 7A, FIG. 7B, and FIG. 7C are each an exemplary graph of the correlation between the current and the time during Ni electroplating containing Sn ions in the third embodiment according to the present disclosure. In the example of FIG. 7A, first, Ni electroplating containing Sn ions is performed on the underlying electrode layer 32 in accordance with the first current profile in which a constant current of 2 A is maintained for 50 minutes. Next, in accordance with the second current profile in which a constant current of 22 A is maintained for 50 minutes, Ni electroplating containing Sn ions is further performed. Afterwards, Ni electroplating containing Sn ions is performed in accordance with the third current profile in which a constant current of 2 A is maintained for 50 minutes. In the example in FIG. 7B, first, Ni electroplating containing Sn ions is performed on the underlying electrode layer 32 in accordance with the first current profile in which the current is increased from 2 A to 22 A over 50 minutes (i.e., the increasing rate of the current is 0.4 A/min). In this case, the first current profile includes a part of the second profile in which current is in the range of 20 A to 22 A. Next, in accordance with the second current profile in which a constant current of 22 A is maintained for 50 minutes, Ni electroplating containing Sn ions is further performed. Afterwards, Ni electroplating containing Sn ions is performed in accordance with the third current profile in which a constant current of 2 A is maintained for 50 minutes. In the example in FIG. 7C, first, Ni electroplating containing Sn ions is performed on the underlying electrode layer 32 in accordance with the first current profile in which current is increased from 2 A to 22 A over 50 minutes (i.e., the increasing rate of the current is 0.4 A/min). In this case, the first current profile includes a part of the second profile in which current is in the range of 20 A to 22 A. Next, in accordance with the second current profile in which a constant current of 22 A is maintained for 50 minutes, Ni electroplating containing Sn ions is further performed. Afterwards, Ni electroplating containing Sn ions is performed in accordance with the third current profile in which current is decreased from 22 A to 2 A over 50 minutes. In this case, the third current profile includes a part of the second current profile in which current is in the range of 22 A to 20 A. In each step in examples of FIG. 7A, FIG. 7B, and FIG. 7C, when the current is less than 20 A, the Ni—Sn alloy plating layer 33a or the Ni—Sn alloy plating layer 33a' is formed, and when the current is 20 A or more, the Ni plating layer 33b is formed.

At last, in the same manner as in the first embodiment, Sn plating is performed on the Ni—Sn alloy plating layer 33a' to form the Sn plating layer 33c, which is the outermost layer. The method of Sn plating is not particularly limited and may be Sn electroplating.

Fourth Embodiment

Figure 8:
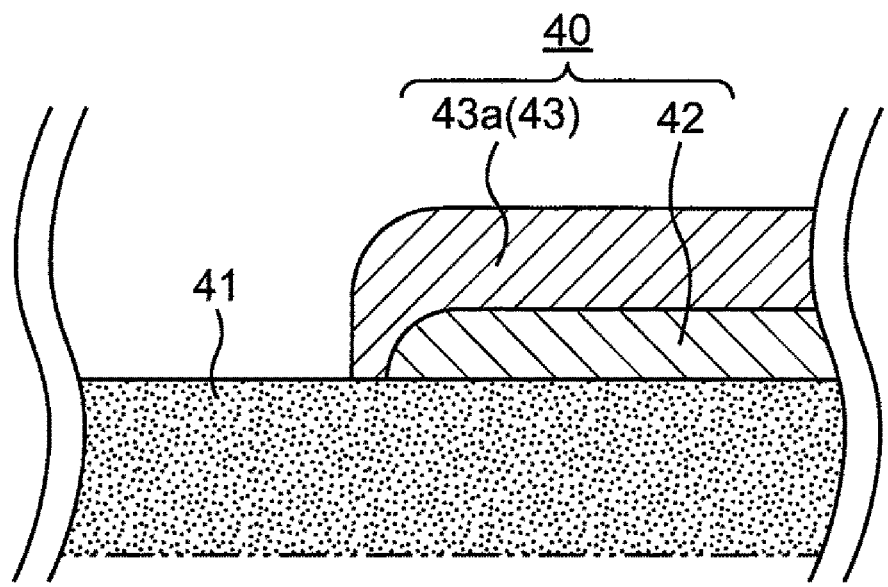
FIG. 8 is a cross-sectional view of a fourth embodiment of the outer electrode of the electronic component according to the present disclosure.

FIG. 8 is a cross-sectional view of a fourth embodiment of the outer electrode of the electronic component according to the present disclosure. As illustrated in FIG. 8, an outer electrode 40 includes an underlying electrode layer 42 positioned so as to be in contact with an element main body 41 and a Ni—Sn alloy plating layer 43a positioned so as to be in contact with the underlying electrode layer 42, particularly so as to cover the underlying electrode layer 42. A plating layer 43 includes the Ni—Sn alloy plating layer 43a positioned on the underlying electrode layer 42 so as to be in contact with the underlying electrode layer 42. As described above, the element main body 41 may be included in any electronic component.

In the fourth embodiment, the function, the material, and the thickness of the underlying electrode layer 42 and the function, the material, and the thickness of the Ni—Sn alloy plating layer 43a are the same as those in the second embodiment, except that the plating layer 43 does not include a Sn plating layer.

As described above, in the fourth embodiment, the Ni—Sn alloy plating layer 43a is positioned on the underlying electrode layer 42 of the outer electrode 40 in the same manner as in the first embodiment. Thus, a space is not formed between the underlying electrode layer 42 and the Ni—Sn alloy plating layer 43a. Owing to this, ingress of water to the underlying electrode layer 42 is unlikely to occur in a high-humidity and high-pressure environment, and thus, electrochemical migration is unlikely to occur. Furthermore, the outer electrode 40 in the fourth embodiment can include, for example, any plating layer having a composition suitable for various electrical connections, such as soldering, on the Ni—Sn alloy plating layer 43a and can thus be used in a wide variety of applications.

The method for producing an electronic component including the outer electrode 40 in the fourth embodiment is the same as that in the first embodiment, except that Sn plating is not performed at last.

In a certain embodiment, the electronic component may be a common mode choke coil and include at least two coil conductors and at least two pairs of the outer electrodes.

Figure 9:
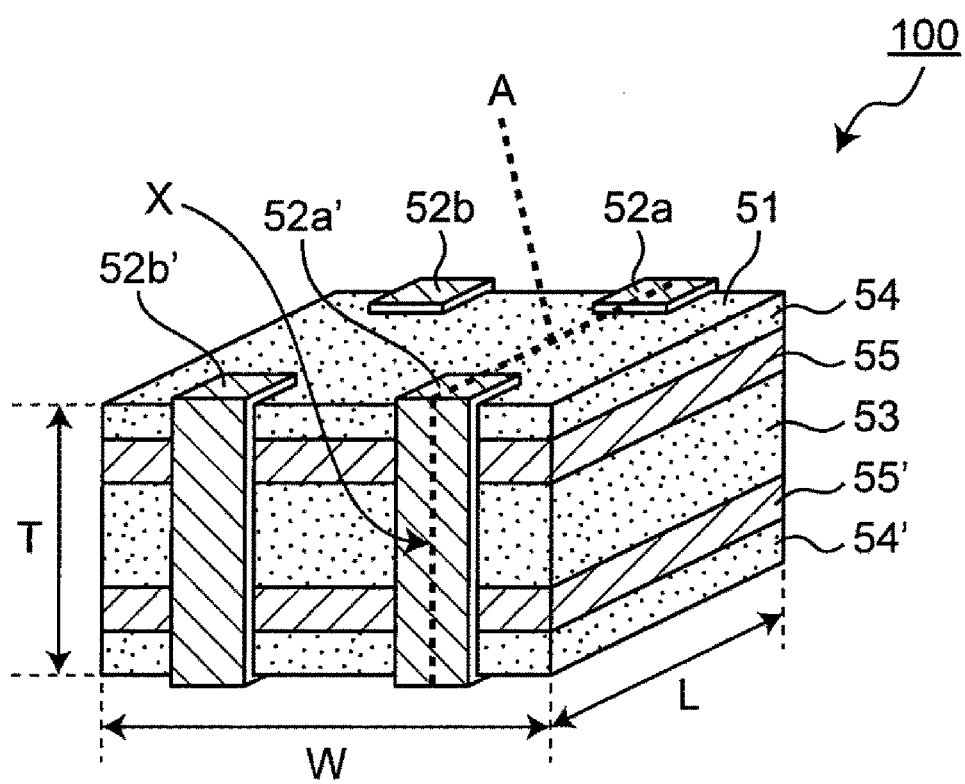
FIG. 9 is a perspective view of a common mode choke coil that is an exemplary electronic component according to the present disclosure.
Figure 10:
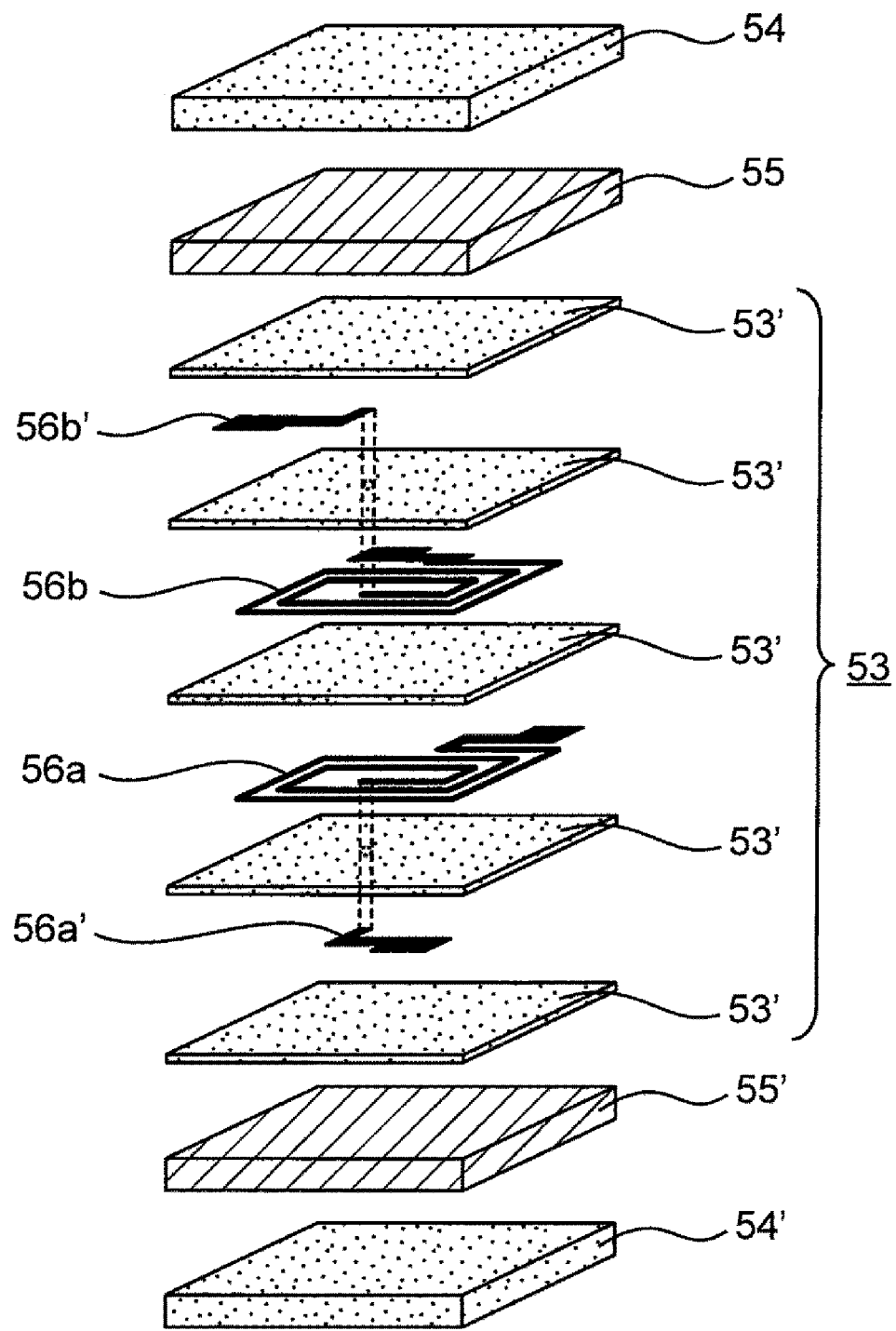
FIG. 10 is a schematic exploded view of a common mode choke coil that is an exemplary electronic component according to the present disclosure.

The specific structure of a common mode choke coil to which the present disclosure is applied is not particularly limited. An exemplary structure will be described. FIG. 9 is a perspective view of a common mode choke coil that is an exemplary electronic component according to the present disclosure. FIG. 10 is a schematic exploded view of a common mode choke coil that is an exemplary electronic component according to the present disclosure. As illustrated in FIG. 9 and FIG. 10, a common mode choke coil 100 includes an element main body 51, which is a multilayer body in which a second non-magnetic layer 54, a magnetic layer 55, a first non-magnetic layer 53, a magnetic layer 55', and a second non-magnetic layer 54' are stacked on each other in this order, a coil conductor 56a with 56a' and a coil conductor 56b with 56b' that are disposed in the first non-magnetic layer 53, and two pairs of outer electrodes 52a and 52a' and outer electrodes 52b and 52b' that are electrically connected to the coil conductors. As illustrated in FIG. 10, the first non-magnetic layer 53 may include several non-magnetic sheets 53'. The second non-magnetic layers 54 and 54' may each include several non-magnetic sheets, and the magnetic layers 55 and 55' may each include several magnetic sheets.

Each material of the first non-magnetic layer 53 (non-magnetic sheet 53') and the second non-magnetic layers 54 and 54' is not particularly limited, provided that such a material has non-magnetic characteristics and is usable as a material of the non-magnetic layer (e.g., dielectric glass sheet) of a typical common mode choke coil. For example, each material of the non-magnetic layers may contain a dielectric glass material containing a glass component and a filler component. Specifically, the dielectric glass material may contain 40 mass % or more and 90 mass % or less (i.e., from 40 mass % to 90 mass %) of the glass component and 10 mass % or more and 60 mass % or less (i.e., from 10 mass % to 60 mass %) of the filler component relative to the total mass. The glass component may contain at least one or more of K, Al, B, and Si. For example, the glass component may contain 0.5 mass % or more and 5 mass % or less (i.e., from 0.5 mass % to 5 mass %) of K in terms of $K_2O$, 0 mass % or more and 5 mass % or less (i.e., from 0 mass % to 5 mass %) of Al in terms of $Al_2O_3$, 10 mass % or more and 25 mass % or less (i.e., from 10 mass % to 25 mass %) of B in terms of $B_2O_3$, and 70 mass % or more and 85 mass % or less (i.e., from 70 mass % to 85 mass %) of Si in terms of $SiO_2$. The filler component may contain quartz and alumina.

The methods for producing the first non-magnetic layer 53 (non-magnetic sheet 53') and the second non-magnetic layers 54 and 54' are not particularly limited. In an exemplary method, first, a dielectric glass material ground with a device using, for example, a ball mill, the device being known to one skilled in the art, is kneaded with, for example, a binder in the presence of a solvent to obtain a slurry, and then the resulting slurry is subjected to, for example, a doctor blade method to obtain a green sheet.

The material of the magnetic layers 55 and 55' is not particularly limited, provided that such a material has magnetic characteristics and is usable as a material of the magnetic layer of a typical common mode choke coil. For example, the material of the magnetic layers 55 and 55' may contain a ferrite material, particularly a Zn—Cu—Ni-based ferrite material. Specifically, the Zn—Cu—Ni-based ferrite material may contain 40 mol % or more and 49.5 mol % or less (i.e., from 40 mol % to 49.5 mol %) of Fe in terms of $Fe_2O_3$, 5 mol % or more and 35 mol % or less (i.e., from 5 mol % to 35 mol %) of Zn in terms of ZnO, and 4 mol % or more and 12 mol % or less (i.e., from 4 mol % to 12 mol %) of Cu in terms of CuO, with the balance being a material formed of NiO. In such a case, unavoidable impurities and a slight amount of additive (e.g., Mg, Si, Bi, Co, or Sn) may be contained.

The method for producing the magnetic layers 55 and 55' is not particularly limited. In an exemplary method, first, component powders are mixed together with, for example, pure water and ground with a device using, for example, a ball mill, the device being known to one skilled in the art, to obtain a slurry. The obtained slurry is subjected to evaporative drying and thereafter calcined. The calcined powder is subsequently mixed again with, for example, a binder in the presence of a solvent and ground to obtain a slurry. The resulting slurry is subjected to, for example, a doctor blade method to obtain the magnetic layers 55 and 55'.

The material of the coil conductors 56a, 56a', 56b, and 56b' is not particularly limited, provided that such a material contains a conductive material. For example, the material of the coil conductors 56a, 56a', 56b, and 56b' may contain a material containing metal, particularly a material containing one or more of Cu and Ag (the material may be an alloy containing Cu and Ag), and more particularly a material containing Ag.

The coil conductor 56a with 56a' and the coil conductor 56b with 56b' may be disposed so as to face each other with the non-magnetic sheet 53', which is a part of the first non-magnetic layer 53, disposed therebetween. Furthermore, the coil conductors 56a, 56a', 56b, and 56b' may be formed so as to be electrically connected to the respective outer electrodes 52a, 52a', 52b, and 52b' via via holes formed in the non-magnetic sheets 53'. For example, specific positions and shapes of the coil conductors 56a, 56a', 56b, and 56b' are not particularly limited. The coil conductors 56a, 56a', 56b, and 56b' can be each formed by, for example, printing or applying a conductor pattern on a green sheet obtained by the above method. In such a case, via conductors may be appropriately formed to pass through via holes, and the conductor patterns may be formed to be electrically connected to the outer electrodes 52a, 52a', 52b, and 52b'.

The method for producing the common mode choke coil 100 may be any method known to one skilled in the art. For example, the second non-magnetic layer 54, the magnetic layer 55, the first non-magnetic layer 53 in which the coil conductors 56a, 56a', 56b, and 56b' are formed, the magnetic layer 55', and the second non-magnetic layer 54', which are produced as described above, are stacked on each other as illustrated in FIG. 10. Then, for example, the resulting multilayer body is pressurized during heating and pressure-bonded. Thereafter, the pressure-bonded multilayer body is appropriately cut and, if necessary, subjected to binder removal treatment. The multilayer body may subsequently be fired, for example, with the temperature raised at a rate of 300° C./h or more and 1200° C./h or less (i.e., from 300° C./h to 1200° C./h). The firing temperature may be appropriately changed in accordance with, for example, the material and the thickness of the multilayer body. In such a way, the element main body 51 can be produced. The above-described outer electrodes according to the first embodiment to the fourth embodiment are each formed on the obtained element main body 51 to produce the common mode choke coil 100.

Hereinafter, Examples of the present disclosure will be described. The features of the following Examples of the present disclosure are illustrative and do not limit the present disclosure.

EXAMPLES

To confirm electrochemical migration resistance of the outer electrode of the electronic component according to the present disclosure, common mode choke coils in Example 1 to Example 3 and Comparative Example were produced and evaluated.

Production of Common Mode Choke Coil

Production of Element Main Body of Common Mode Choke Coil

First, to produce the non-magnetic layers, a glass powder containing K, Al, B, and Si at a predetermined ratio (a glass component) and a quartz powder and an alumina powder (filler components) were prepared. The glass powder, the quartz powder, and the alumina powder were each weighed in a predetermined amount and were put into a ball mill with an organic binder, a solvent, a plasticizer, and a partially stabilized zirconia (PSZ) ball, mixed together, and ground to obtain a slurry. The obtained slurry was subjected to a doctor blade method to produce a dielectric glass sheet having a thickness of 10 μm or more and 30 μm or less (i.e., from 10 μm to 30 μm).

In some of the dielectric glass sheets produced as described above, a via hole was formed in a predetermined portion by laser irradiation. The via hole was filled with a Ag-based conductive paste to form a via conductor. Furthermore, the Ag-based conductive paste was applied by screen printing to form a coil conductor pattern and a lead-out conductor pattern.

To produce the magnetic layers, a $Fe_2O_3$ powder, a ZnO powder, a CuO powder, and a NiO powder were prepared. Such powders were each weighed in a predetermined amount and were put into a ball mill with pure water and a PSZ ball, mixed together, and ground to obtain a slurry. The obtained slurry was subjected to evaporative drying and thereafter calcined at 700° C. or higher and 800° C. or lower (i.e., from 700° C. to 800° C.) for a predetermined time to produce a calcined powder. Next, the calcined powder, an organic binder, a solvent, a plasticizer, and a PSZ ball were put into a ball mill again, mixed together, and ground to obtain a slurry. The obtained slurry was subjected to a doctor blade method to produce a magnetic sheet having a thickness of 10 μm or more and 30 μm or less (i.e., from 10 μm to 30 μm).

Next, a predetermined number of dielectric glass sheets each having no coil conductor pattern printed thereon, a predetermined number of magnetic sheets, a predetermined number of dielectric glass sheets each having a coil conductor pattern or a lead-out conductor pattern printed thereon, a predetermined number of magnetic sheets, and a predetermined number of dielectric glass sheets each having no coil conductor pattern printed thereon were stacked on each other in a predetermined order and pressurized by 100 MPa during heating at 73° C. to be pressure-bonded. This produced a multilayer molded body block. The multilayer molded body block was diced by using a dicer to produce unfired multilayer molded bodies. The unfired multilayer molded body was put into a sagger and subjected to binder removal treatment at 500° C. in the ambient atmosphere. Thereafter, firing was performed at 900° C. for two hours to form an element main body.

Production of Outer Electrode on Element Main Body of Common Mode Choke Coil

On the end surfaces of the fired element main body, a paste for outer electrodes that contained Ag as a main constituent was applied on portions where the outer electrodes 52a, 52a', 52b, and 52b' were to be formed as illustrated in FIG. 9. The paste was baked at 810° C. to form four underlying electrode layers. Next, the element main body on which the underlying electrode layers were formed was put into the Ni electroplating bath with loosened balls (stirring media) for enhancing stirring and a medium having the outermost surface formed of Sn (SOLDERSHOT 400, ball, Sn 99%, Ag 0.1%). Then, current was applied to form Ni—Sn alloy plating layers on the underlying electrode layers and to form Ni plating layers on the Ni—Sn alloy plating layers, in sequence.

In such a process in Example 1, a current of 2 A was applied for 20 minutes to 40 minutes (i.e., first current profile) and thereafter a current of 20 A was applied for 20 minutes (i.e., second current profile) to form each layer. Furthermore, in Example 2 and Example 3, the time for applying a current of 2 A in the first step was appropriately adjusted to change the thickness of the Ni—Sn alloy plating layer.

At last, after washed with pure water, the element main body including Ni plating layers, which were the outermost layers of the outer electrodes, was put into the Sn electroplating bath with loosened balls (stirring media) for enhancing stirring and a medium (SOLDERSHOT 400, ball, Sn 99%, Ag 0.1%) to form Sn plating layers on the Ni plating layers in each Example, thereby producing a common mode choke coil in each Example.

In Comparative Example, the common mode choke coil was produced in the same manner as in Example 1, except that applying a current of 2 A for 20 minutes to 40 minutes (i.e., first current profile) was not performed.

Confirmation of Structure of Outer Electrode of Produced Common Mode Choke Coil

The structure of the outer electrode of the common mode choke coil in each of Examples and Comparative Example was analyzed in detail. The outer dimensions of the common mode choke coil in each of Examples and Comparative Example were as follows: dimension L was 1.25 mm, dimension W was 1.00 mm, and dimension T was 0.5 mm. The dimensions L, W, and T are shown in FIG. 9.

Each plating layer of the common mode choke coils was observed as described below, and the thickness thereof was measured. Each common mode choke coil was placed vertically, and the resin was hardened around the coil such that surface LT illustrated in FIG. 9 was exposed. Next, each coil was polished by using a polisher in direction W in FIG. 9 to the substantially center portion of the outer electrode (about ¼ of dimension W in direction W), in other words, to bold dotted line A in FIG. 9. To remove protrusions of the outer electrode that were caused by polishing, the polished surface was processed, after polishing, by ion milling with IM 4000 ion milling system manufactured by Hitachi High-Technologies Corporation. A portion of the substantially center portion of the outer electrode of the polished common mode choke coil (the portion indicated by arrow X on bold dotted line A in FIG. 9) in each of Examples and Comparative Example was subjected to mapping analysis of Sn and Ni by wavelength-dispersive X-ray spectrometry.

The result of the mapping analysis of Sn and Ni confirmed that a Ni—Sn alloy plating layer in which Ni and Sn were present was formed in Example 1 to Example 3. In Comparative Example, a Ni—Sn alloy plating layer was not confirmed. Here, in each of Examples and Comparative Example, the thickness of each layer (Ni—Sn alloy plating layer, Ni plating layer, and Sn plating layer) was a thickness confirmed and measured by the mapping analysis. Specifically, the thickness of the Ni—Sn alloy plating layer in each Example was measured as follows. As described above, each coil was polished to the substantially center portion of the outer electrode (about ¼ of dimension W in direction W). Then, a portion in the Ni layer that was near or at the interface between Ag of the underlying electrode layer and the Ni layer was subjected to mapping analysis of Sn by using wavelength-dispersive X-ray spectrometry with JXA-8100 manufactured by JEOL Ltd. under conditions of an accelerating voltage of 15 kV and an irradiation current of $5 \times 10^{-8}$ A. The thickness of the Ni—Sn alloy plating layer refers to the thickness of the Sn co-deposited region in which Sn was detected in the Ni layer. The thickness of each layer in Examples and Comparative Example is shown with evaluation results of electrochemical migration in Table 1.

Evaluation of Electrochemical Migration of Outer Electrode of Common Mode Choke Coil Ten common mode choke coils produced as described above in each of Examples and Comparative Example were soldered to mounted substrates by using a solder paste (M705-GRN360 manufactured by SENJU METAL INDUSTRY CO., LTD.). Under conditions of a temperature of 60° C. and a relative humidity of 93% RH, a voltage of DC 10 V was applied. After 300 hours, the elongation of Ag of the underlying electrode layer was measured under a microscope. Then, the maximum elongation of 10 coils in each of Examples and Comparative Example was determined.

The measurement results of the elongation of Ag of the underlying electrode layers (evaluation results of electrochemical migration) are shown with the thickness of the layers in each of Examples and Comparative Example in the following Table 1.

TABLE 1

| | Thickness of layer (μm) | | | |
| --- | --- | --- | --- | --- |
| | Ni—Sn alloy plating layer | Ni plating layer | Sn plating layer | Maximum elongation of Ag (μm) |
| Example 1 | 2 | 3 | 4 | 30 |
| Example 2 | 3 | 3 | 4 | 5 |
| Example 3 | 4 | 3 | 4 | 0 |
| Comparative Example | 0 | 3.5 | 4 | 100 |

As shown in Table 1, it has been found that when the Ni—Sn alloy plating layer is deposited and confirmed between the Ag underlying electrode layer and the Ni plating layer, the maximum elongation is extremely smaller than that in a case in which the Ni—Sn alloy plating layer is not deposited, in other words, electrochemical migration resistance is more excellent.

The present disclosure provides an electronic component including an outer electrode having excellent electrochemical migration resistance in a high-humidity and high-pressure environment and a method for producing the electronic component.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:
an element main body; and
at least a pair of outer electrodes on the element main body,
wherein
the outer electrodes each include an underlying electrode layer positioned to directly contact the element main body and a plating layer positioned to directly contact the underlying electrode layer,
the plating layer includes a Ni—Sn alloy plating layer positioned to directly contact the underlying electrode layer, and
the Ni—Sn alloy plating layer contains a Ni—Sn alloy represented by the following formula (1):

$$(100-x)\text{Ni}-x\text{Sn} \qquad (1)$$

in formula (1), x represents Sn content (at %) and satisfies 5≤x≤50.

2. The electronic component according to claim 1, wherein the underlying electrode layer contains one or more of Ag and Cu.

3. The electronic component according to claim 2, wherein the underlying electrode layer contains Ag.

4. The electronic component according to claim 1, wherein
the plating layer further includes a Ni plating layer and a Sn plating layer, and
the Ni—Sn alloy plating layer, the Ni plating layer, and the Sn plating layer are positioned on the underlying electrode layer in this order.

5. The electronic component according to claim 1, wherein the plating layer further includes a Sn plating layer, and the Ni—Sn alloy plating layer and the Sn plating layer are positioned on the underlying electrode layer in this order.

6. The electronic component according to claim 1, wherein
the plating layer further includes a Ni plating layer, another Ni—Sn alloy plating layer, and a Sn plating layer, and
the Ni—Sn alloy plating layer, the Ni plating layer, the other Ni—Sn alloy plating layer, and the Sn plating layer are positioned on the underlying electrode layer in this order.

7. The electronic component according to claim 1, wherein the Ni—Sn alloy plating layer has a thickness of 0.1 μm to 15 μm.

8. The electronic component according to claim 1, wherein
the electronic component is a coil component and further includes a coil conductor embedded in the element main body, and
the coil conductor and the outer electrodes are electrically connected to each other.

9. The electronic component according to claim 8, wherein the electronic component is a common mode choke coil and includes at least two of the coil conductors and at least two pairs of the outer electrodes.

10. The electronic component according to claim 2, wherein
the plating layer further includes a Ni plating layer and a Sn plating layer, and
the Ni—Sn alloy plating layer, the Ni plating layer, and the Sn plating layer are positioned on the underlying electrode layer in this order.

11. The electronic component according to claim 2, wherein the plating layer further includes a Sn plating layer, and the Ni—Sn alloy plating layer and the Sn plating layer are positioned on the underlying electrode layer in this order.

* * * * *